US012671044B2

(12) United States Patent
Arrighetti et al.

(10) Patent No.: US 12,671,044 B2
(45) Date of Patent: Jun. 30, 2026

(54) LOW-VOLTAGE SWITCH POLE

(71) Applicant: ABB S.p.A., Milan (IT)

(72) Inventors: Pierantonio Arrighetti, Bergamo (IT); Pierre Corfdir, Wettingen (CH)

(73) Assignee: ABB S.p.A., Milan (IT)

( * ) Notice: Subject to any disclaimer, the term of this patent is extended or adjusted under 35 U.S.C. 154(b) by 327 days.

(21) Appl. No.: 18/426,655

(22) Filed: Jan. 30, 2024

(65) Prior Publication Data

US 2024/0266127 A1 Aug. 8, 2024

(30) Foreign Application Priority Data

Feb. 7, 2023 (EP) .................................... 23155404

(51) Int. Cl.
*H01H 33/10* (2006.01)
*H01H 33/53* (2006.01)

(52) U.S. Cl.
CPC ............ *H01H 33/10* (2013.01); *H01H 33/53* (2013.01)

(58) Field of Classification Search
CPC ............ H01H 1/226; H01H 1/14; H01H 1/58; H01H 9/38; H01H 9/383; H01H 9/46; H01H 9/44; H01H 9/34; H01H 9/346; H01H 9/36; H01H 2009/348; H01H 33/10; H01H 33/53; H01H 33/662; H01H 71/08; H01H 73/04; H01H 73/18
USPC .................. 218/1, 22, 24, 25, 28, 29, 34, 43
See application file for complete search history.

(56) References Cited

U.S. PATENT DOCUMENTS

| | | | | |
|---|---|---|---|---|
| 2,555,799 A | | 6/1951 | Lerstrup | |
| 3,070,681 A | | 12/1962 | Wood | |
| 3,081,389 A | * | 3/1963 | Carter | H01H 9/44 218/149 |
| 3,155,801 A | | 11/1964 | Pokorny | |
| 3,629,533 A | * | 12/1971 | Kuznetsov | H01H 9/36 218/22 |
| 7,220,933 B2 | * | 5/2007 | Baiatu | H01H 9/42 218/36 |
| 9,715,979 B2 | * | 7/2017 | Bresciani | H01H 33/10 |

FOREIGN PATENT DOCUMENTS

| | | |
|---|---|---|
| CN | 114843159 A | 8/2022 |
| DE | 143003 C | 8/1903 |

OTHER PUBLICATIONS

European Extended Search Report, Application No. 23155404.9, dated Aug. 24, 2023, 12 pps.

* cited by examiner

*Primary Examiner* — William A Bolton
(74) *Attorney, Agent, or Firm* — McCarter & English, LLP

(57) ABSTRACT

A switch pole for a low-voltage switching device is provided. The switch pole includes an insulating casing defining an internal space with a contact region and an arc extinguishing region of the switch pole, a first pole terminal and a second pole terminal couplable with corresponding line conductors of an electric line, a fixed contact assembly and a movable contact assembly positioned in the contact region and including one or more fixed contacts and one or more movable contacts, respectively, which can be mutually coupled or uncoupled, an arc chamber positioned in the arc extinguishing region and including a plurality of parallel arc-breaking plates, and a magnetic field generation arrangement configured to generate a magnetic field during an opening maneuver of the switch pole.

18 Claims, 17 Drawing Sheets

LOW-VOLTAGE SWITCH POLE

CROSS REFERENCE TO RELATED APPLICATIONS

This patent application claims the benefit and priority of European Patent Application No. 23155404.9 filed on Feb. 7, 2023, the disclosure of which is incorporated by reference herein in its entirety as part of the present application.

BACKGROUND

The present disclosure relates to a switch pole for a switching device suitable for installation in low-voltage electrical systems. The disclosure likewise relates to a switching device including one or more of said switch poles.

Low-voltage switching devices, such as for example circuit breakers, disconnectors, contactors, or the like, include one or more switch poles, each including one or more fixed contacts and movable contacts that can be coupled to and uncoupled from one another.

Switching devices of the known art also include driving means designed to move the movable contacts relative to said fixed contacts, so that these electric contacts can be mutually coupled or uncoupled, thereby allowing or preventing electric currents to flow along the switch poles. These driving means include, for instance, a number of mechanisms terminating in a shaft operatively connected to a movable contact assembly including the movable contacts.

As is known, during an opening maneuver of a switching device, electric arcs may arise between the electric contacts under separation of the switch poles, particularly under stress conditions (e.g., in presence of overload currents or short-circuit currents).

In order to break currents circulating along the switch poles, such arcing phenomena have to be extinguished as quickly as possible. To this aim, a switching device generally includes, for each switch pole, an arc chamber including a number of arc-breaking elements positioned near the electric contacts and designed to split possible electric arcs arising between the electric contacts. Unfortunately, an uneven distribution of electric arcs among the arc-breaking elements of the arc chamber often occurs during the opening maneuver of a switch pole. As a result, the arc-quenching action exerted by the arc-breaking elements is not uniform and efficient, which may adversely affect the lifetime of the arc chamber itself and lead to an early decay of its functionalities, thereby remarkably limiting the overall performances of the switching device. Moreover, it has been seen that electric arcs may sometime strike towards other conductive parts of the switch pole, which are located outside the arc chamber of the switch pole. Obviously, the switch components possibly affected by these electric arcs may be subject to serious damages, since they are not generally designed to bear high electric and thermal stresses.

The above-mentioned problems of the state of the art are even made more critical by the circumstance that, in modern electric power distribution grids, switching devices are often brought to operate to relatively high operating voltages (e.g., up to 2.0-2.5 kV either AC or DC). Electric arcs with a huge energy content may therefore arise between the electric contacts under separation during the opening maneuvers of the switching device.

BRIEF DESCRIPTION

The main purpose of the present disclosure is to provide a switch pole for low-voltage switching devices, which allows overcoming or mitigating the above-mentioned shortcomings.

In particular, the present disclosure is aimed at providing a switch pole, in which electric arcs arising between the electric contacts under separation during the opening maneuvers of the switching device develop uniformly along the arc chamber and are efficiently confined in the arc breaking region of the switch pole.

A further aspect of the present disclosure is to provide a switch pole, in which arcing phenomena towards parts outside the arc-extinguishing region of the switch pole are prevented or remarkably reduced.

A still further aspect of the present disclosure is to provide a switch pole reliable in operation and relatively easy and cheap to manufacture at industrial level.

The above aims and purposes, as well as other purposes that will emerge clearly from the following description and attached drawings, are provided, according to the disclosure, by a switch pole for a low-voltage switching device, according to the following claim 1 and the related dependent claims. In a general definition, the switch pole, according to the disclosure, includes an insulating casing, which defines an internal space including a contact region and an arc extinguishing region.

The switch pole, according to the disclosure, includes a first pole terminal and a second pole terminal configured to be coupled with corresponding line conductors of an electric line.

The switch pole, according to the disclosure, includes a fixed contact assembly arranged in said contact region and including a plurality of fixed electric contacts electrically connected to said first pole terminal. Said fixed electric contacts include one or more first fixed contacts and one or more second fixed contacts electrically insulated from said first fixed contacts.

The switch pole, according to the disclosure, includes a movable contact assembly arranged in said contact region and including a plurality of movable electric contacts electrically connected to said second pole terminal. Said movable electric contacts include one or more first movable contacts and one or more second movable contacts. Said movable contact assembly is reversibly movable around a rotation axis, so that said first movable contacts can be coupled to or decoupled from said first fixed contacts and said second movable contacts can be coupled to or decoupled from said second fixed contacts, when said movable contact assembly moves about said rotation axis.

The switch pole, according to the disclosure, includes an arc chamber arranged in said arc extinguishing region and including a plurality of arc-breaking elements.

The switch pole, according to the disclosure, includes a magnetic field generation arrangement including a first coil conductor and a second coil conductor wound around a winding axis parallel to the rotation axis of said movable contact assembly. Said first and second coil conductors are spaced one from another along said winding axis and are electrically connected in series between said second fixed contacts and said first pole terminal.

The magnetic field generation arrangement is configured to generate a magnetic field during an opening maneuver of the switch pole. The magnetic field generated by said magnetic field generation arrangement is directed in such a way to make possible electric arcs, which arise between said fixed contact assembly and said movable contact assembly under separation during said opening maneuver, displace towards the arc extinguishing region of said switch pole.

Said first and second coil conductors may be arranged at opposite lateral walls of said insulating casing.

According to an aspect of the disclosure, said first and second coil conductors include first and second coil terminals and third and fourth coil terminals respectively.

The first coil terminal of said first coil conductor is electrically connected to said second fixed contacts through a first electric bus.

The second coil terminal of said first coil conductor is electrically connected to the third coil terminal of said second coil conductor through a second electric bus.

The fourth coil terminal of said second coil conductor is electrically connected to said first pole terminal through a third electric bus.

According to an aspect of the disclosure, the switch pole includes an additional casing structure to accommodate said first and second coil conductors and said first, second and third electric buses. Said additional casing structure is fixed to said insulating casing.

According to an aspect of the disclosure, the switch pole includes a magnetic shield arrangement combined with said magnetic field generation arrangement and located at an opposite side of the switch pole relative to said fixed contact assembly. Said magnetic field arrangement is configured to confine better the magnetic field generated by said magnetic field generation arrangement, during an opening maneuver of the switch pole, within the internal volume defined by the insulating casing.

The magnetic shield arrangement may include a U-shaped magnetic yoke having a central portion, which is arranged at a front wall of said insulating casing, and a pair of lateral portions, which are arranged at opposite lateral walls of said insulating casing.

The central portion of said magnetic yoke may be arranged on a first support fixed to said insulating casing at said front wall.

The lateral portions of said magnetic yoke may be arranged on corresponding second supports fixed to said additional casing structure, at opposite lateral walls of said insulating casing.

According to an aspect of the disclosure, said movable contact assembly is reversibly movable, about the aforesaid rotation axis, between a first position, which corresponds to a closed condition of said switch pole, and a second position, which corresponds to an open condition of said switch pole.

When said movable contact assembly is in said first position:

- said first movable contacts are coupled to said first fixed contacts; and
- said second movable contacts are decoupled from said second fixed contacts.

When said movable contact assembly is in said second position:

- said first movable contacts are decoupled from said first fixed contacts; and
- said second movable contacts are decoupled from said second fixed contacts.

During an opening maneuver of said switch pole, said movable contact assembly moves from said first position to a first intermediate position, in which:

- said first movable contacts are coupled to said first fixed contacts; and
- said second movable contacts are coupled to said second fixed contacts.

During said opening maneuver, said movable contact assembly then moves from said first intermediate position to a second intermediate position, in which:

- said first movable contacts are decoupled from said first fixed contacts; and
- said second movable contacts are coupled to said second fixed contacts.

During said opening maneuver, said movable contact assembly then moves from said second intermediate position to said second position.

In a further aspect, the present disclosure relates to a low-voltage switching device, such as a circuit breaker, including at least a switch pole, according to disclosure, as described above.

BRIEF DESCRIPTION OF THE DRAWINGS

Further features and advantages of the present disclosure will be evident from the description of example but not exclusive embodiments of a switch pole, according to the disclosure, shown by way of examples in the accompanying drawings, wherein.

DETAILED DESCRIPTION

With reference to the attached figures, the present disclosure relates to a switch pole 1 for a low-voltage switching device, e.g. a circuit breaker, a disconnector, a contactor, or the like.

The switching device is particularly adapted for use in AC low-voltage electrical systems, and it will be described with particular reference to these applications. However, in principle, it may be used also in electric systems of different type, e.g., in DC low-voltage electrical systems.

For the purposes of the present disclosure, the term "low-voltage" typically relates to operating voltages up to 2.0 kV AC and 2.5 kV DC.

The switching device includes one or more switch poles, according to the disclosure.

The number of switch poles may vary, according to the needs.

In some embodiments, the switching device may be of the three-phase type, and it includes three switch poles. However, according to other embodiments of the disclosure, the switching device may include a different number of switch poles depending on the number of electric phases of the electric circuit, in which it has to be installed.

According to the disclosure, the switch pole 1 includes an insulating casing 2 defining an internal volume including a contact region 3 and an arc extinguishing region 4 (FIGS. 8-13). In general, the contact region 3 is a portion of internal volume of the switch pole where the contact assemblies of the switch pole are arranged and operate. On the other hand, the arc-extinguishing region 4 is a portion of internal volume of the switch pole where there are arranged arc-quenching means designed to extinguish possible electric arcs arising between the electric contacts of the switch pole, during the opening maneuvers.

The contact region 3 and the arc extinguishing region 4 are adjacent and in fluid-dynamic communication one with another. The arc extinguishing region 4 may be positioned at an upper level with respect to the contact region 3, i.e. in proximal position relative to a top side of this latter.

Figure 1:
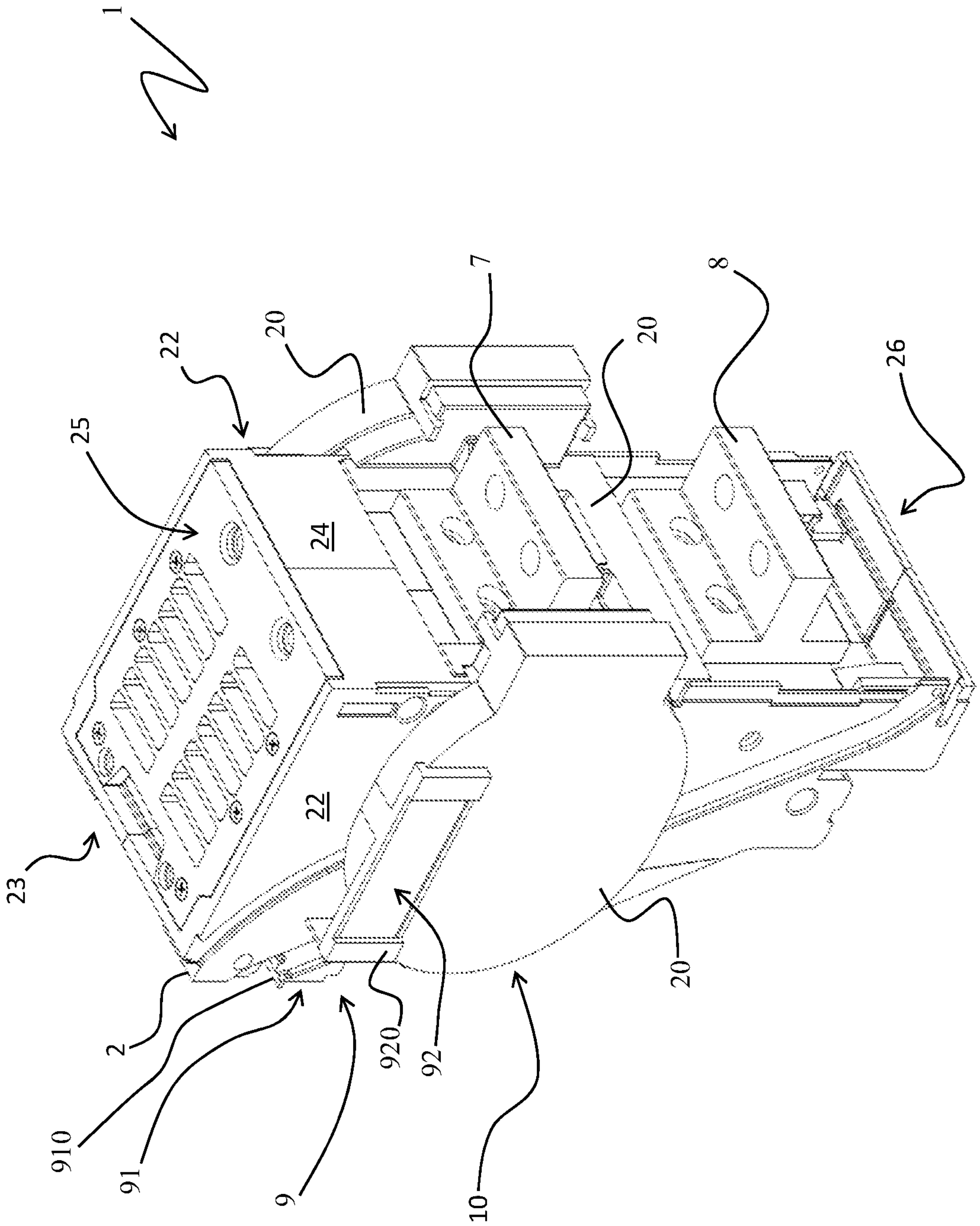
FIG. 1 is a schematic view of the switch pole, according to the disclosure.
Figure 2:
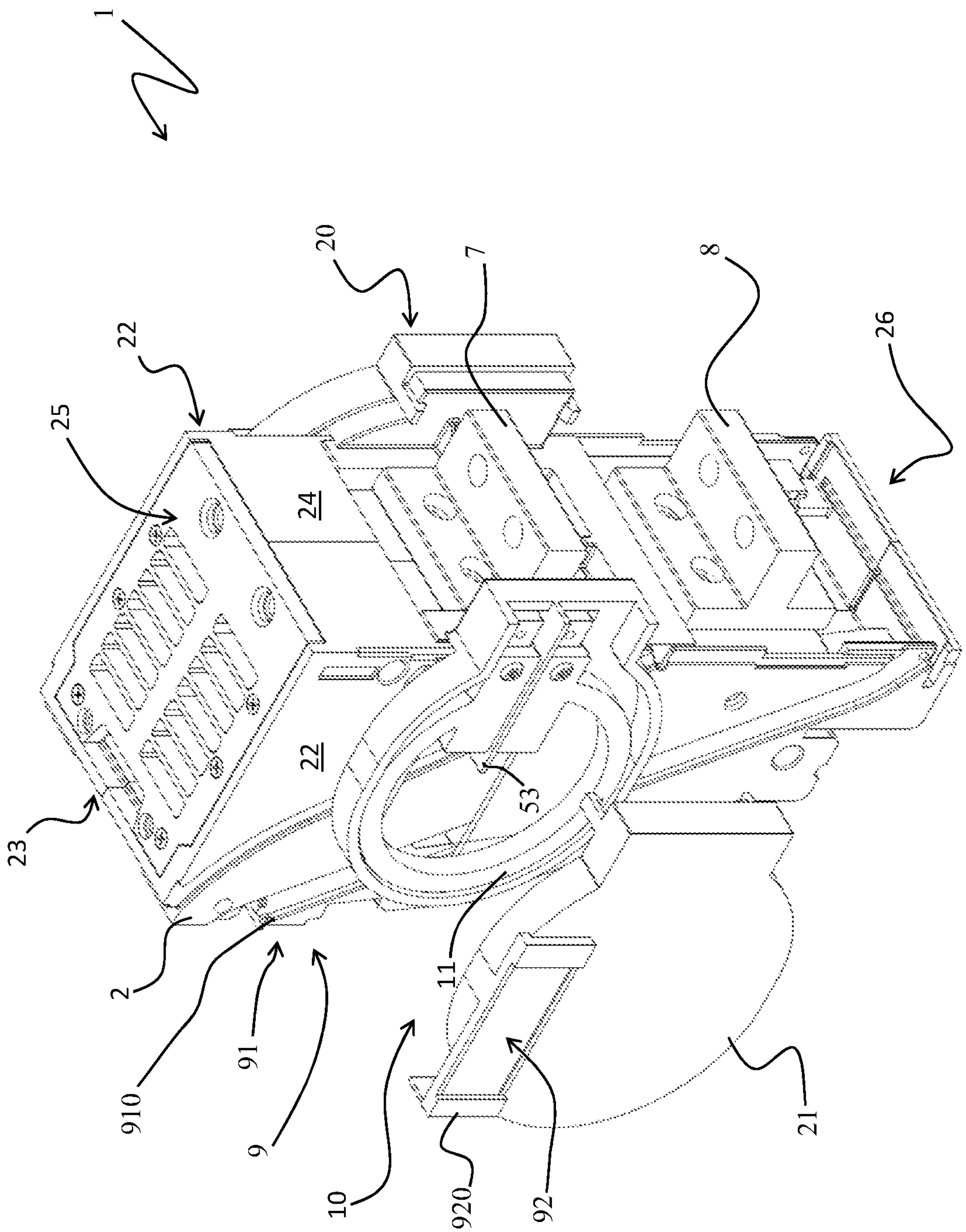
FIGS. 2-9 are additional schematic views of the switch pole, according to the disclosure.

For the sake of clarity, it is specified that relative terms used in this disclosure, e.g., "front", "rear", "lateral", "upper", "lower", "top" and "bottom" relate to the switch pole 1 in its normal installation conditions, namely in the "vertical" installation (FIG. 1).

The insulating casing 2 of the switch pole is shaped as a contoured box with opposite first and second lateral walls 21, 22, opposite front and rear walls 23, 24 and opposite top and bottom walls 25, 26.

The insulating casing 2 may be formed by first and second half shells joined to each other. In this case, the top wall 25 of the insulating casing 2 may be fixed to the insulating enclosure of another component (the arc chamber) of the switch pole and it may be removably installed in the switch pole together with such a component. However, according to other embodiments of the disclosure (not shown), the insulating casing 2 of the switch pole may be arranged differently. For example, the top wall 25 may be integral with other walls of the insulating casing or it may be self-standing so as to be removably couplable with the remaining walls of the insulating casing.

The top wall 25 may be provided with a number of through openings to allow the exit of hot gases from the internal space of the switch pole, in particular from the arc extinguishing region 4. The insulating casing 2 is made of an electrically insulating material, e.g., a thermosetting or thermoplastic material.

According to the disclosure, the switch pole 1 includes a first pole terminal 7 and a second pole terminal 8 couplable with corresponding line conductors of an electric line.

In operation, the pole terminals 7, 8 are electrically coupled (in a known manner) with corresponding line conductors of an electric line. Such line conductors are, in turn, electrically connected to an electric power source (e.g., an electric power feeding or generation system or a section of electric grid) and to an electric load (e.g., an electric system or apparatus or a section of electric grid), respectively.

For the sake of clarity, it is specified that the terms "coupled", "decoupled" or "couplable" used in this disclosure relate to both an electrical and mechanical coupling/decoupling of different parts unless otherwise specified or self-evident from the description or figures.

The pole terminals 7, 8 may be positioned at the rear wall 24 of the insulating casing of the switch pole.

According to the disclosure, a switch pole 1 includes a fixed contact assembly 5 and a movable contact assembly 6 arranged in the contact region 3 of the switch pole.

The fixed contact assembly 5 includes one or more fixed electric contacts 51, 52 that, in general, are electrically connected to the first pole terminal 7.

More particularly, the fixed contact assembly 5 includes one or more first fixed contacts 51 and one or more second fixed contacts 52, which are spaced apart from the fixed contacts 51 and electrically insulated from these latter.

The first and second fixed contacts 51, 52 are therefore electrically connected in parallel to the first pole terminal 7 but they are mutually spaced and electrically insulated.

The first and second fixed contacts 51, 52 may be positioned at the rear wall 24 of the insulating casing of the switch pole.

The first and second fixed contacts 51, 52 may be arranged respectively in distal position and in proximal position relative to the arc-extinguishing region 4 of the switch pole.

The first fixed contacts 51 may be formed by a pair of conductive tips arranged on a first conductive base 51A directly coupled to the first pole terminal 7 (FIGS. 10-13).

Similarly, the second fixed contacts 52 may be formed by a pair of conductive tips arranged on a second conductive base 52A electrically connected to the first pole terminal 7 through other conductive components of the switch pole (FIGS. 10-13) as it will better emerge from the following.

The first and second fixed contacts 51, 52 may protrude at different heights relative to a common reference plane defined by the respective conductive bases 51A, 52A. More particularly, the first fixed contacts 51 protrude at a greater height compared to the second fixed contacts 52 (FIGS. 10-13).

The fixed contact assembly 5 may include a first spacer 53 of electrically insulating material interposed between the first and second fixed contacts 51, 52 in order to insulate electrically these latter one from another.

The fixed contact assembly 5 may include a second spacer 54 of electrically insulating material interposed between the first pole terminal 7 and the second fixed contacts 52 in order to prevent a direct electrical coupling between these components (which are electrically connected through other conductive components of the switch pole as it will better emerge from the following).

The fixed contact assembly 5 may include an elongated conductive plate 55 (e.g., formed by a metal material) electrically connected to the second fixed contacts 52. The conductive plate 55 extends from the second fixed contacts 52 towards the arc extinguishing region 4 and it is arranged at the rear wall 24 of the insulating casing 2.

The movable contact assembly 6 includes one or more movable electric contacts 61, 62 that are, in general, electrically connected to the second pole terminal 8.

More particularly, the movable contact assembly 6 includes one or more first movable contacts 61 and one or more second movable contacts 62 (FIGS. 10-13).

The first and second movable electric contacts 61, 62 may be electrically connected one to another and electrically connected in parallel to the second pole terminal 8.

The first and second movable contacts 61, 62 may be arranged in distal position and in proximal position relative to the arc-extinguishing region 4 of the switch pole, respectively.

The first and second movable contacts 61, 62 may be formed by first and second pairs of conductive fingers, respectively, which protrude from a conductive head 65 electrically connected to the second pole terminal 8.

The movable contact assembly 6 is reversibly movable around a rotation axis A1, which may be perpendicular to the lateral walls 21, 22 of the insulating casing of the switch pole.

The movable contact assembly 6 may include a supporting structure 63 for the movable contacts 61, 62. Such a supporting structure can conveniently rotate about the rotation axis A1 and it includes a connecting element 64, which protrudes outside the insulating casing of the switch pole (which may be from a suitable window of the front wall 23) for connection with a driving mechanism (not shown).

The conductive head 65 on which the movable contacts 61, 62 may be mounted, is hinged to the supporting structure 63. The conductive head 65 thus rotates together with the supporting structure 63 and it can slightly tilt relative to said supporting structure, when this latter moves. In this way, when the supporting structure 63 rotates according to a rotation direction, the conductive head 65 can tilt slightly with an opposite rotation movement relative to the supporting structure 63.

Figure 9:
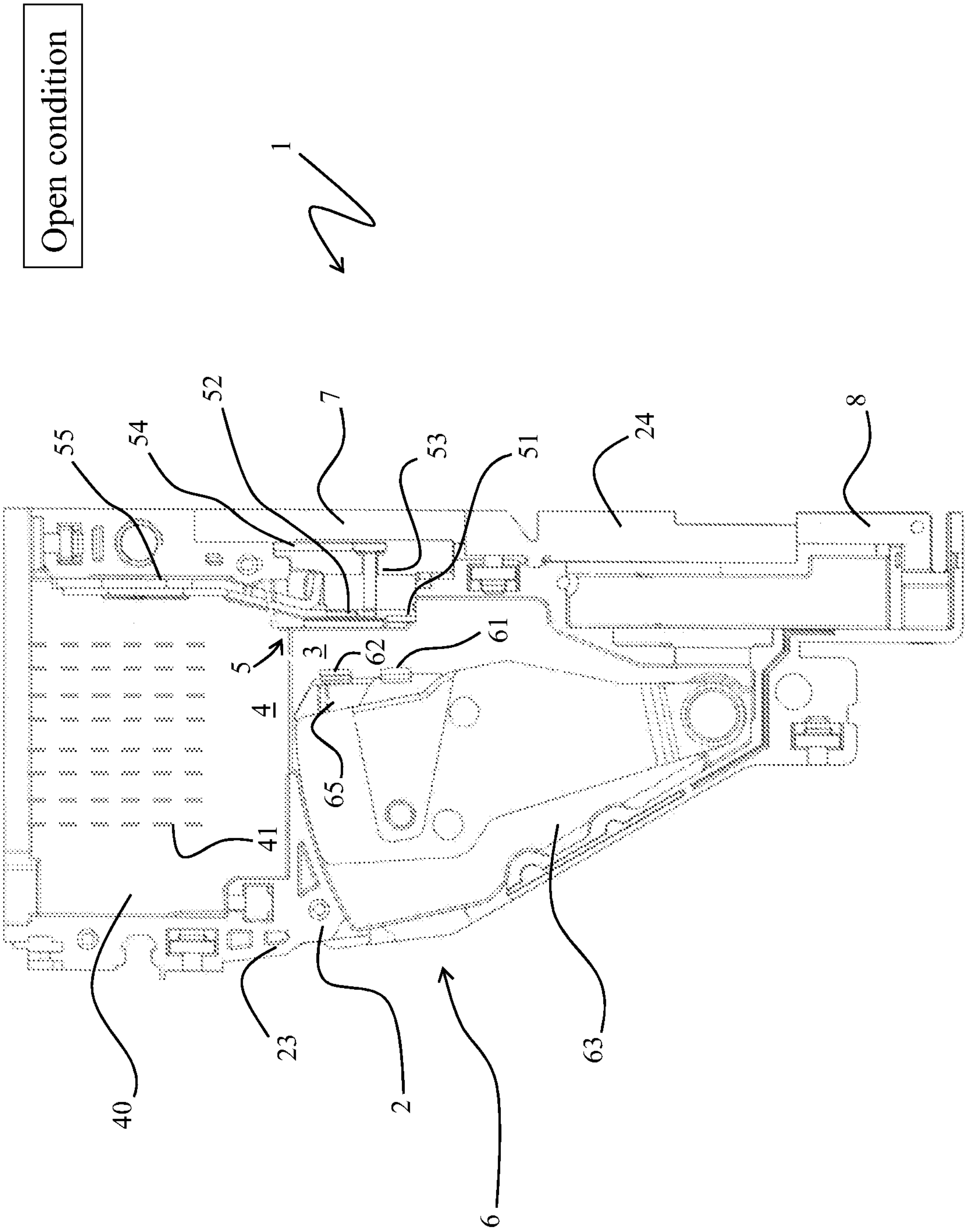
Figure 13:
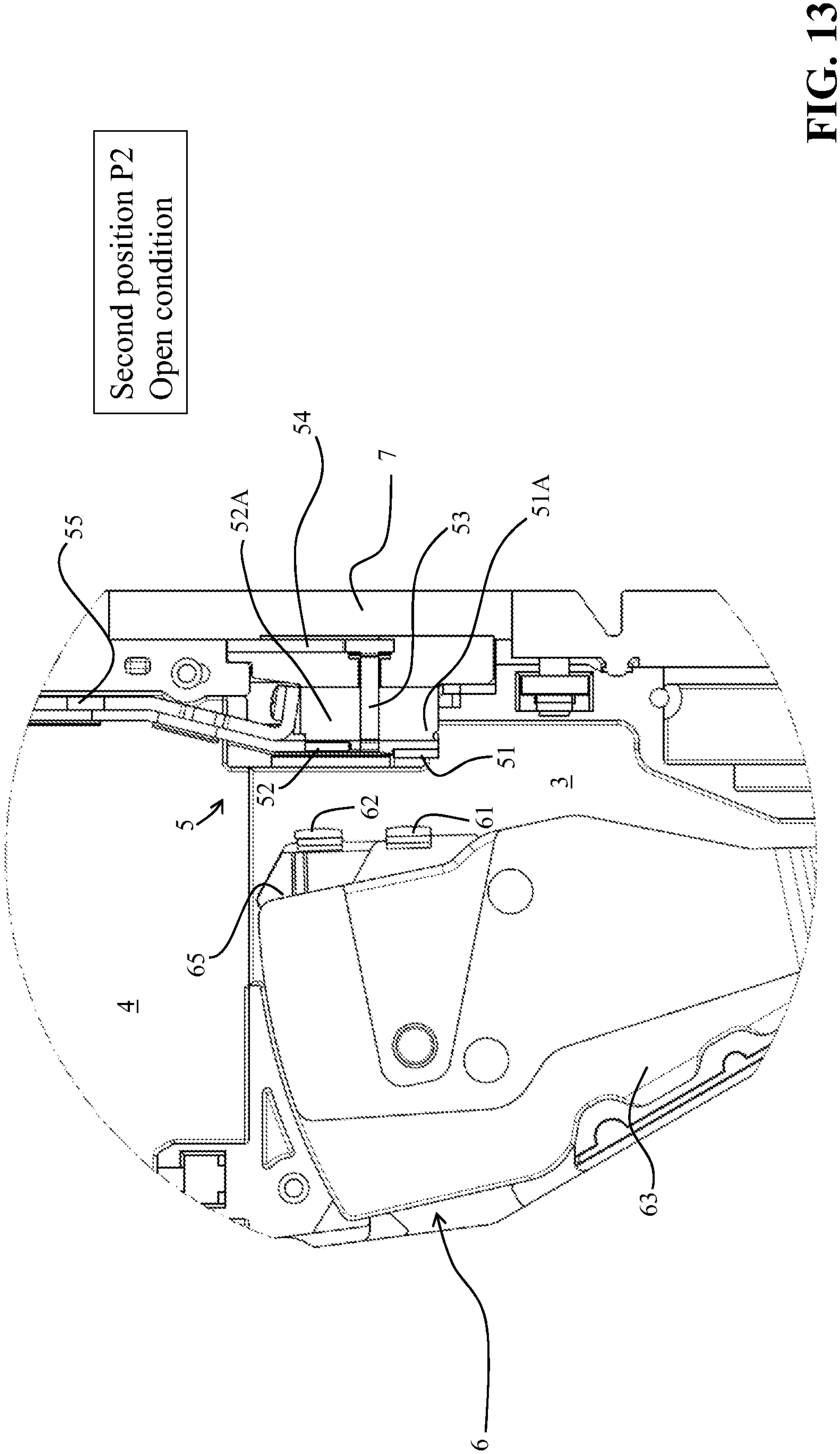

The movable contact assembly 6 is movable, about the rotation axis A1, between a first position P1 (FIGS. 8 and 10) and a second position P2 (FIGS. 9 and 13). In this way, the first movable contacts 61 can be coupled to or decoupled from the first fixed contacts 51 while the second movable contacts 62 can be coupled to or decoupled from the second fixed contacts 52.

The first position P1 of the movable contact assembly 6 corresponds to a closed condition of the switch pole, in which electric currents are allowed to flow between the pole terminals of the switch pole, whereas the second position P2 of the movable contact assembly 6 corresponds to an open condition of the switch pole, in which electric currents flowing along the switch pole are interrupted.

Conveniently, the movable contact assembly 6 moves between the first and second positions P1, P2 by rotating about the rotation axis A1 according to opposite rotation directions. A transition of the movable contact assembly 6 from the first position P1 to the second position P2 constitutes an opening maneuver of the switch pole whereas an opposite transition of the movable contact assembly 6 from the second position P2 to the first position P1 constitutes a closing maneuver of the switch pole.

According to an aspect of the disclosure, the movable contact assembly 6 and the fixed contact assembly 5 are arranged so that the first and second movable contacts 61, 62 decouple from the first and second fixed contacts 51, 52, according to a specific opening sequence (described in the following), during an opening maneuver of the switch pole (FIGS. 10-13).

When the movable contact assembly 6 is the first position P1 (closed condition of the switch pole), the first movable contacts 61 are coupled to the first fixed contacts 51 while the second movable contacts 62 are decoupled from the second fixed contacts 52 (FIG. 9).

During an opening maneuver of the switch pole, upon an initial movement according to a rotation direction R about the rotation axis A1 (FIGS. 10-11), the movable contact assembly 6 moves from the first position P1 to a first intermediate position P3 (FIG. 11), in which:

- the first movable contacts 61 are coupled to the first fixed contacts 51; and
- the second movable contacts 62 are coupled to the second fixed contacts 52.

Upon a further movement according to the rotation direction R (FIGS. 11-12), the movable contact assembly 6 moves from the first intermediate position P3 to a second intermediate position P4 (FIG. 12), in which:

- the first movable contacts 61 are decoupled from the first fixed contacts 51; and
- the second movable contacts 62 are coupled to the second fixed contacts 52.

Upon yet a further movement according to a rotation direction R (FIGS. 12-13), the movable contact assembly 6 moves from the second intermediate position P4 to the second position P2 (FIG. 13).

When the movable contact assembly 6 is the second position P2, the first movable contacts 61 are decoupled from the first fixed contacts 51 while the second movable contacts 62 are decoupled from the second fixed contacts 52.

As it is evident from FIGS. 10-13, the implementation of the above-described opening sequence of the electric contacts 51, 52, 61, 62 is made possible by the special arrangement of the movable contacts 61, 62 (which are mounted on the tilting head 65) and the special arrangement of the fixed contacts 51, 52 (which protrude at different heights from the respective conductive bases 51A, 52A).

According to an aspect of the disclosure, the movable contact assembly 6 and the fixed contact assembly 5 are arranged so that the first and second movable contacts 61, 62 couple to the first and second fixed contacts 51, 52, according to a specific closing sequence, during a closing maneuver of the switch pole. The closing sequence of the electric contacts is basically opposite compared to the opening sequence described above.

Thus, starting from the second position P2, the movable contact assembly 6 passes first through the second intermediate position P4 and then through the first intermediate position P3 before reaching the first position P1.

According to the disclosure, the switch pole 1 includes an arc chamber 40 positioned in the arc extinguishing region 4, conveniently above the contact region 3.

The arc chamber 40 includes a plurality of arc-breaking elements 41 designed to extinguish possible electric arcs arising between the electric contacts 51, 52, 61, 62 when these latter separate during an opening maneuver of the switch pole (FIGS. 10-13).

According to some embodiments, the arc chamber 40 may be formed by a self-standing structure that can be removably installed in the corresponding switch pole. In this case, the arc chamber 40 includes an insulating enclosure (made of an electrically insulating material, e.g., a thermosetting or thermoplastic material) removably fixable to the insulating casing of the switch pole. The arc-breaking elements 41 are conveniently fixed to said insulating enclosure (not shown). The top wall 25 of the insulating casing of the switch pole may be fixed to said insulating enclosure, so that it can be installed or removed together with the arc chamber 40.

The arc-breaking elements 41 of the arc chamber 40 include a series of arc-breaking plates arranged in parallel, which may be along reference planes parallel to the front and rear walls 23, 24 and perpendicular to the lateral walls 21, 22 of the insulating casing 2. The arc-breaking plates 41 may be arranged at subsequent positions between the front and rear walls 23, 24, at increasing distances from the fixed contact assembly 5.

The arc-breaking plates 41 may be formed by contoured metallic or ceramic plates, which can have different dimensions and shapes according to the needs.

An essential aspect of the disclosure consists in that the switch pole 1 includes a magnetic field generation arrangement 10 configured to generate a magnetic field B, during an opening maneuver of the switch pole.

The magnetic field generation arrangement 10 includes a first coil conductor 11 and a second coil conductor 12 wound around a winding axis A2 parallel to the rotation axis A1 of the movable contact assembly 6 and electrically connected mutually.

The first and second coil conductors 11, 12 are conveniently arranged according to a Helmholtz coil configuration. They are thus centered on the winding axis A2, spaced one from another along the winding axis A2 and electrically connected in series, so that a same current flows along the coil conductors 11, 12 according to concordant directions.

The first and second coil conductors 11, 12 may be arranged at opposite lateral walls 21, 22 of the insulating casing of the switch pole, outside the internal volume of the switch pole.

As mentioned above, the first and second coil conductors 11, 12 are electrically connected in series between the second fixed contacts 52 and the first pole terminal 7 of the switch pole.

The first and second coil conductors 11, 12 have first and second coil terminals 13, 14 and third and fourth coil terminals 15, 16 respectively.

According to an aspect of the disclosure:

the first coil terminal 13 of the first coil conductor 11 is electrically connected to the second fixed contacts 52 through a first electric bus 17;

the second coil terminal 14 of the first coil conductor 11 is electrically connected to the third coil terminal 15 of the second coil conductor 12 through a second electric bus 18; and the fourth coil terminal 16 of the second coil conductor 12 is electrically connected to the first pole terminal 7 through a third electric bus 19.

In the embodiments shown in the cited figures, the first and second coil conductors 11, 12 are formed by corresponding conductive bars forming a single turn around the winding axis A2. Similarly, the first second and third electric buses 17, 18, 19 are formed by shaped conductive bars.

The employment of rigid conductors 11, 12, 17, 18, 19 favors the assembly of the magnetic field generation arrangement and it makes more robust the overall structure of the switch pole.

According to alternative embodiments (not shown), however, each coil conductor 11, 12 may be formed by multiple turns of a conductive wire wound on a suitable rigid insulating support forming a loop centered on the winding axis A2 while the electric buses 17, 18, 19 may be formed by suitable conductive wires.

As mentioned above, the winding axis A2 is parallel to the rotation axis of the movable contact assembly 6. In this way, when a current circulates along the coil conductors 11, 12 during an opening maneuver of the switching apparatus, a magnetic field B crossing the contact region 3 of the switch pole (basically according to a direction perpendicular to the opposite walls 21, 22 of the insulating casing 2) is formed.

Given that the coil conductors 11, 12 are centered on the winding axis A2 and arranged at opposite sides of the contact region 3, the generated magnetic field B has field lines uniformly distributed across the transversal section of the contact region 3.

Additionally, since the coil conductors 11, 12 are electrically connected in series between the second fixed contacts 52 and the first pole terminal 7, any current (AC or DC) flowing along the coil conductors 11, 12 generates a magnetic field B having concordant field lines.

By virtue of the generated magnetic field B, possible electric arcs arising between the fixed contact assembly 5 and the movable contact assembly 6 under separation are affected by a magnetic force Fm (Lorentz force) directed towards the arc-extinguishing region 4 of the switch pole. Such a magnetic force makes said electric arcs displace towards the arc extinguishing region 4.

In practice, possible electric arcs arising between the fixed contact assembly 5 and the movable contact assembly 6 are “blown” by the generated magnetic field B towards the arc extinguishing region 4. They can thus distribute uniformly among the arc-breaking elements 41 of the arc chamber 40, which can efficiently exert their quenching action on them.

The magnetic field B generated by the magnetic field generation arrangement 10 allows confining efficiently the electric arcs in the arc extinguishing region 4, thereby reducing the probability of re-strikes towards other conductive parts of the switch pole.

The switch pole 1 may include an additional casing structure 20 made of electrically insulating material and configured to accommodate the first and second coil conductors 11, 12 and the first, second and third electric buses 17, 18, 19.

Conveniently, the additional casing structure 20 includes a pair of insulating shells to enclose the coil conductors 11, 12 and a number of insulating covers to segregate the electric buses 17, 18, 19 from the surrounding environment.

The additional casing structure 20 is fixed to the insulating casing 2, conveniently at the lateral walls 21, 22 and at the rear wall 24.

Figure 3:
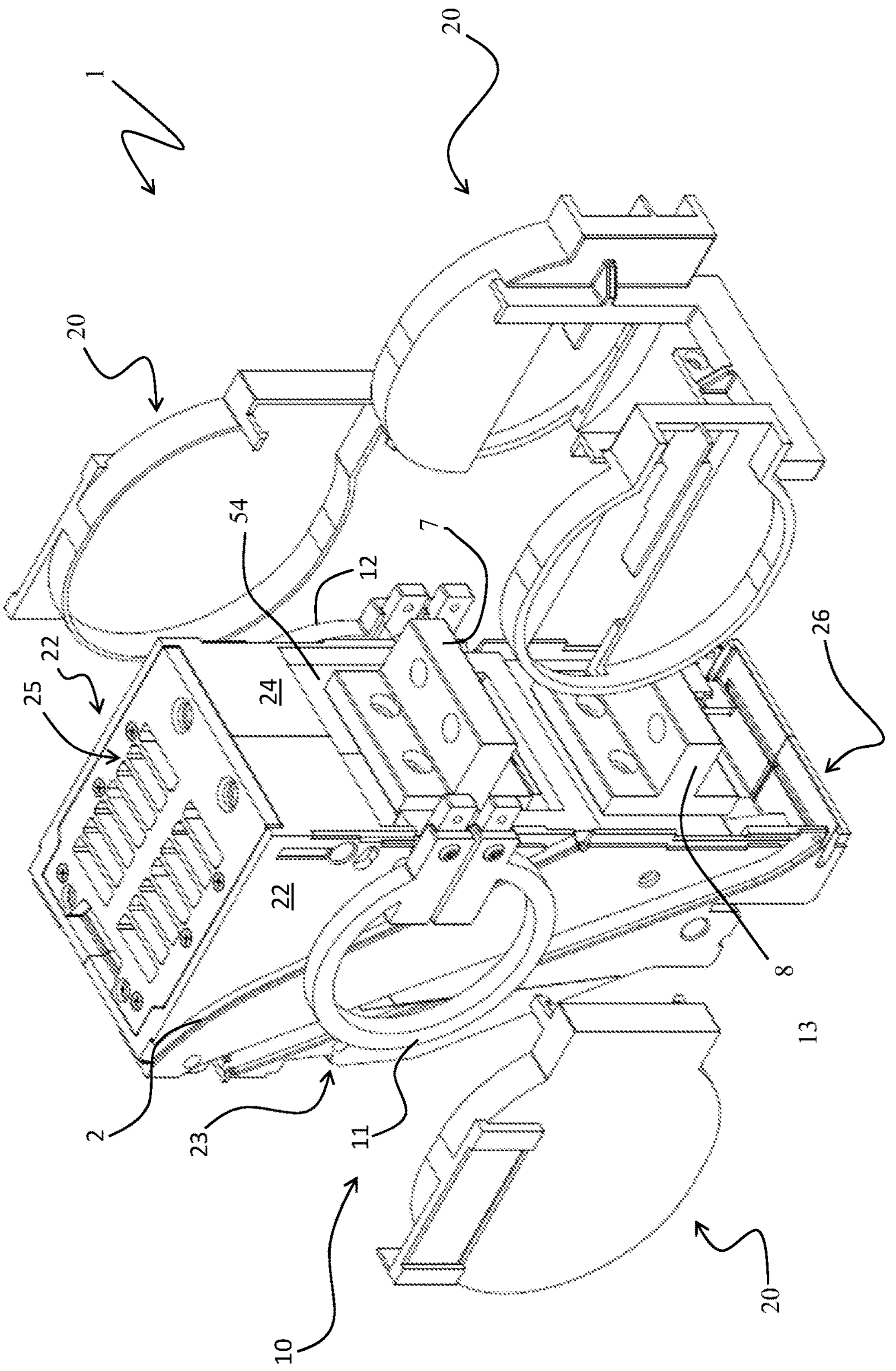
Figure 4:
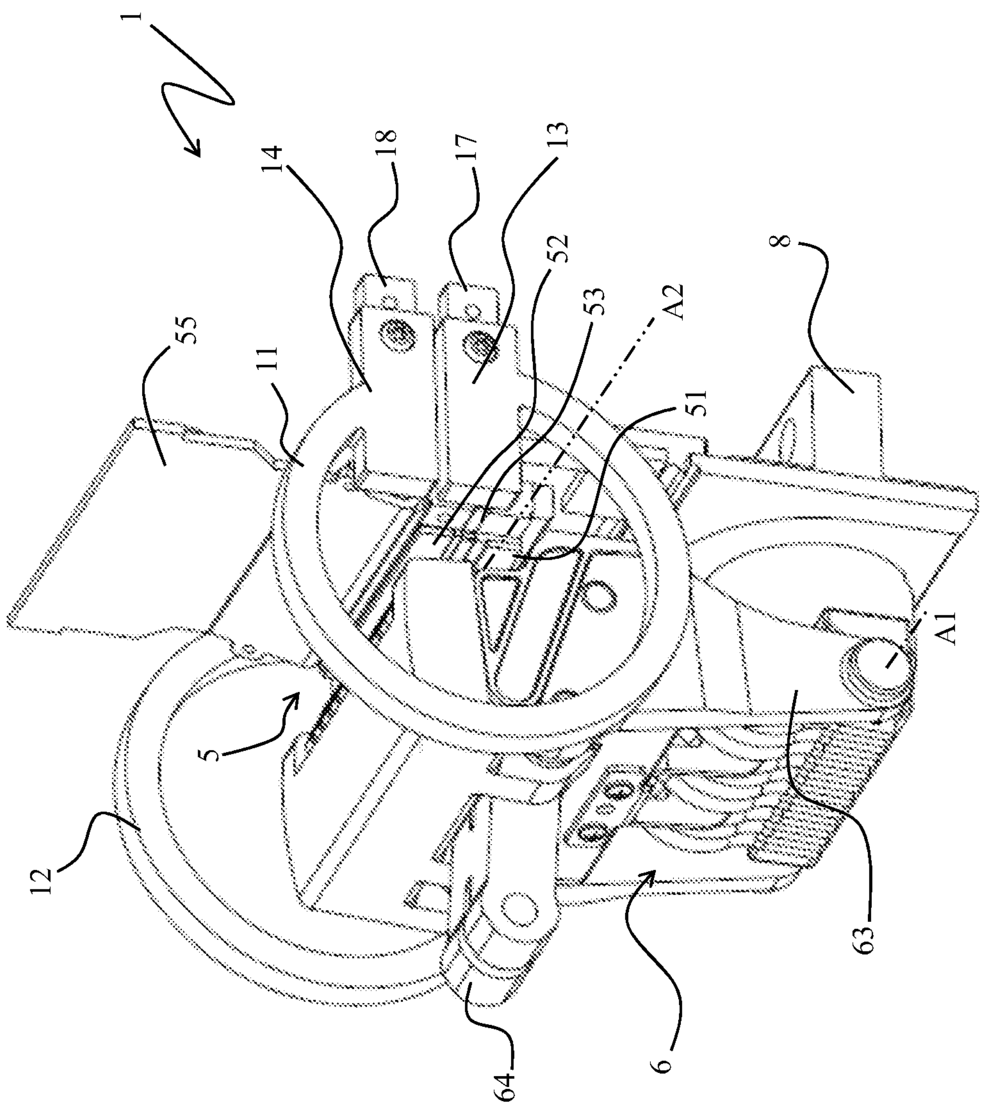
Figure 5:
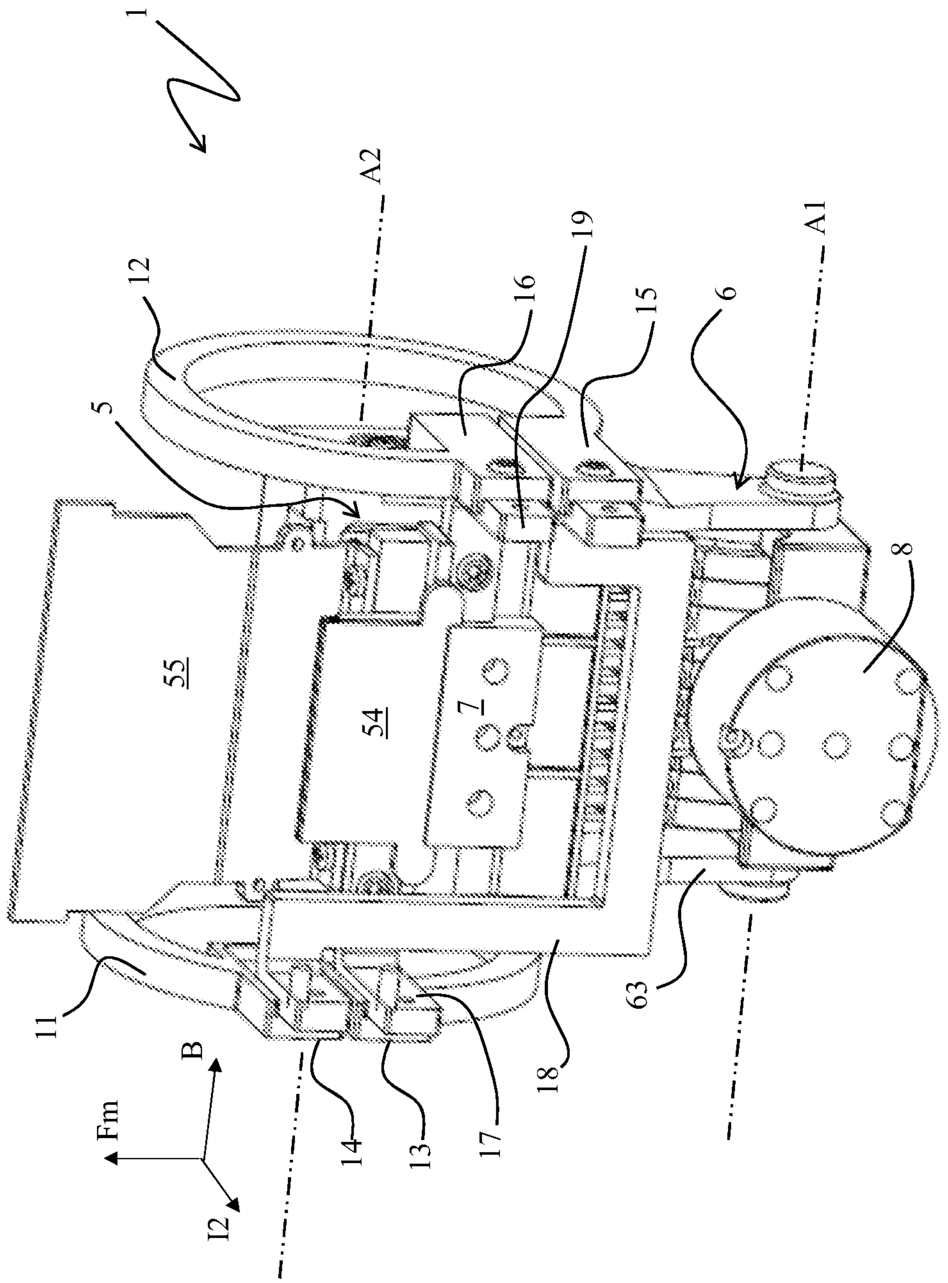
Figure 6:
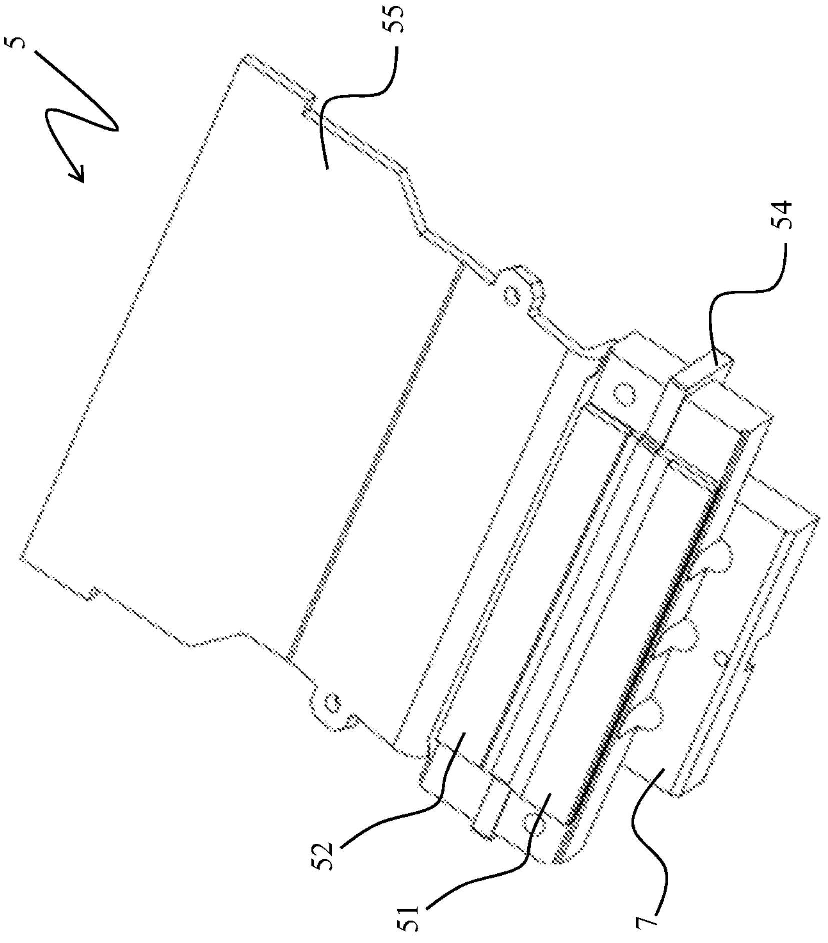
Figure 7:
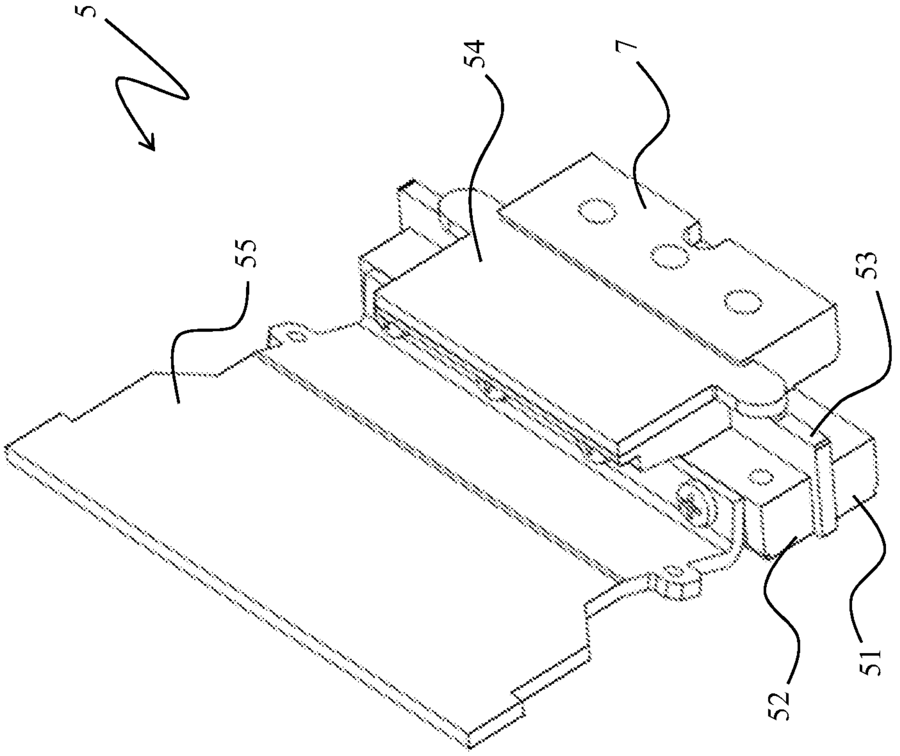
Figure 8:
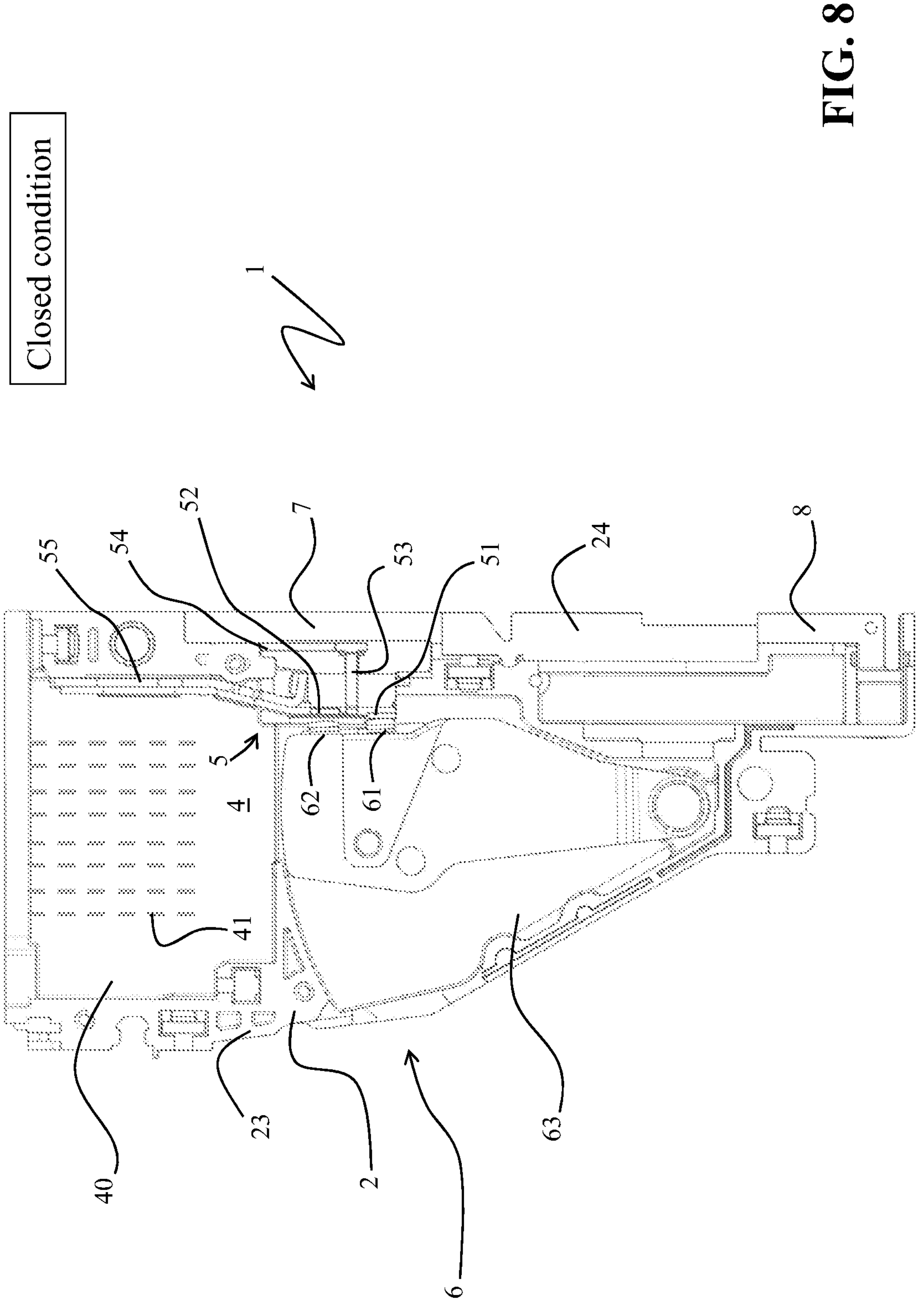

According to an aspect of the disclosure, the switch pole 1 includes a magnetic shield arrangement 9 combined with the magnetic field generation arrangement 10 (FIGS. 3-4).

The magnetic shield arrangement 9 is configured to confine the magnetic field B generated by the magnetic field generation arrangement 10, during an opening maneuver of the switch pole.

The magnetic shield arrangement 9 is located at an opposite side of the switch pole relative to the fixed contact assembly 5.

The magnetic shield arrangement 9 may include a U-shaped magnetic yoke having a central portion 91 arranged at the front wall 23 of the insulating casing 2 and a pair of lateral portions 92 arranged at the opposite lateral walls 21, 22 of said insulating casing.

The central and lateral portions 91, 92 of the magnetic yoke may be formed by plates of magnetic material, which may be ferromagnetic material.

The central and lateral portions 91, 92 of the magnetic yoke may be spaced one from another. This solution allows reducing the overall size of the switch pole even if the confinement action of the magnetic field is slightly less effective compared to an alternative arrangement, in which no air gaps are present between the different portions of the magnetic yoke.

According to this embodiment, the central portion 91 is arranged (e.g., glued) on a first support 910 of electrically insulating material, which is fixed to the insulating casing 2 at the front wall 23, while the lateral portions 92 are arranged (e.g., glued) on corresponding second supports 920 of electrically insulating material, which are fixed to the additional casing structure 20 enclosing the magnetic field generation arrangement 10, at the opposite lateral walls 21, 22 of the insulating casing 2.

It is evident from the above how the magnetic shield arrangement 9 allows confining better the generated magnetic field B within the internal volume defined by the insulating casing 2, particularly limiting its expansion in the surrounding environment at the frontal wall 23 of the insulating casing.

FIGS. 9-16 show the operation of the switch pole 1 during an opening maneuver.

Figure 10:
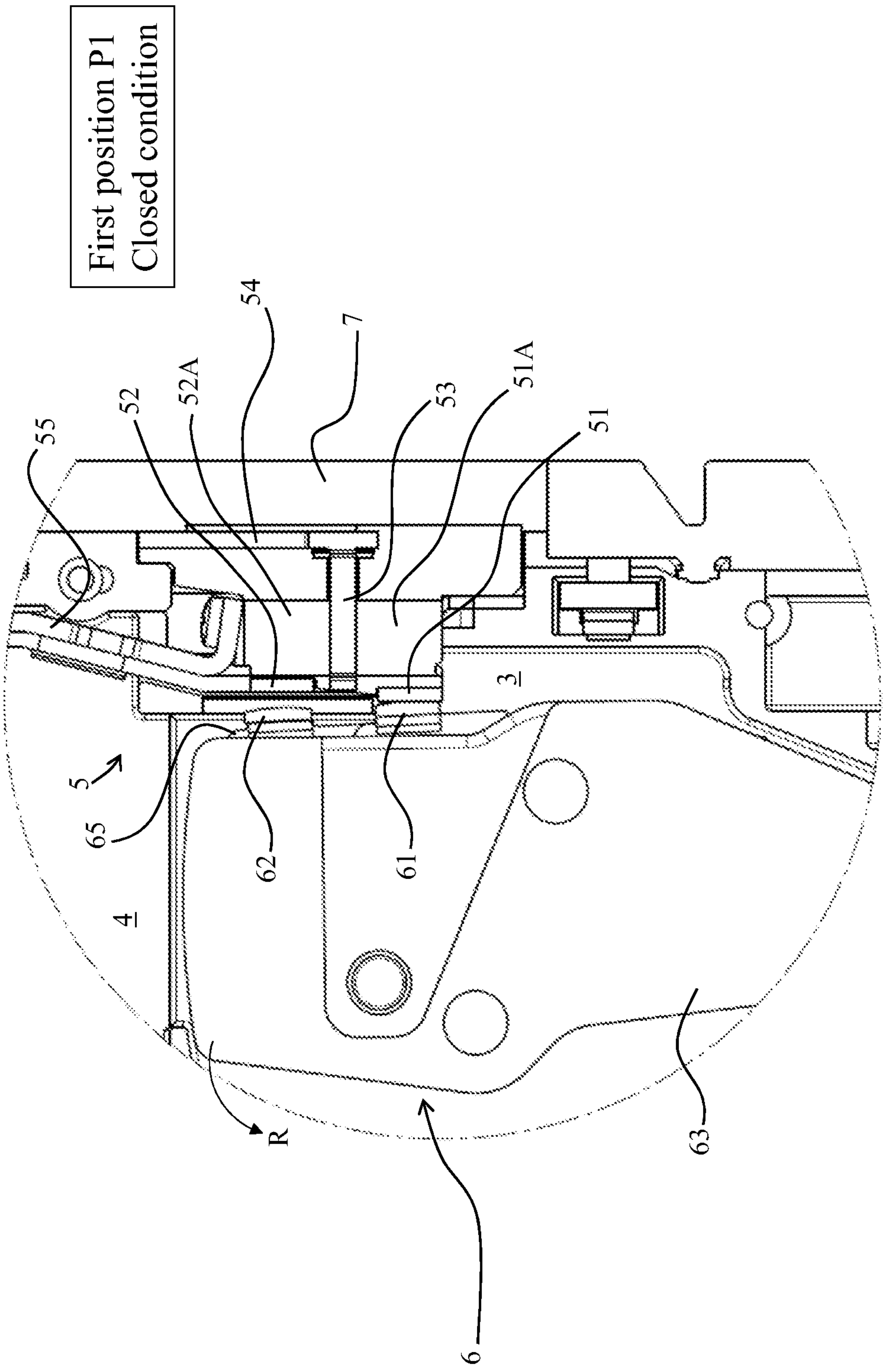
FIGS. 10-17 are schematic views showing the operation of the switch pole, according to the disclosure, during an opening maneuver.

FIG. 10 shows the switch pole with the movable contact assembly 6 in the first position P1 (closed condition of the switch pole).

In this situation, the first movable contacts 61 are coupled to the first fixed contacts 51 while the second movable contacts 62 are decoupled from the second fixed contacts 52.

Figure 14:
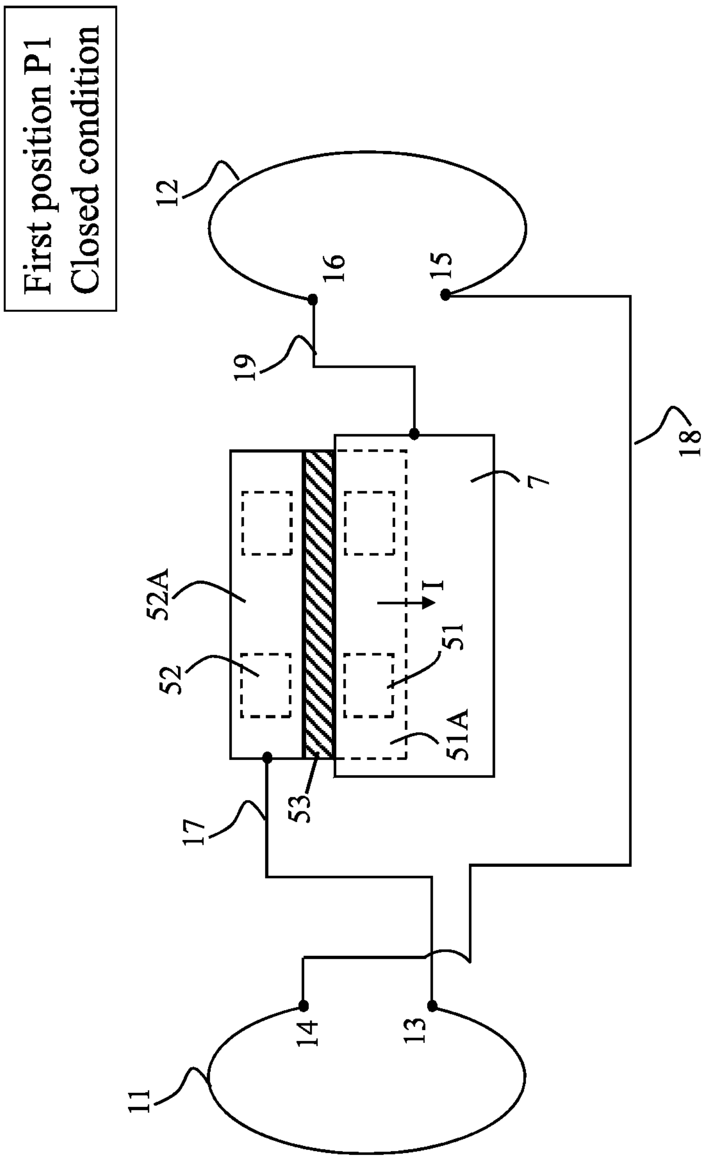

A pole current I can flow along the switch pole between the pole terminals 7, 8. The pole current I passes entirely through the first movable contacts 61 and the first fixed contacts 51 (FIG. 14). No currents flow along the coil conductors 11, 12 as the second movable contacts 62 and the second fixed contacts 51 are decoupled.

No magnetic field is generated by the magnetic field generation arrangement 10 as no currents flow along the coil conductors 11, 12.

No electric arcs arise between the movable contact assembly 6 and the fixed contact assembly 5 as the pole terminals 7, 8 are short-circuited.

Figure 11:
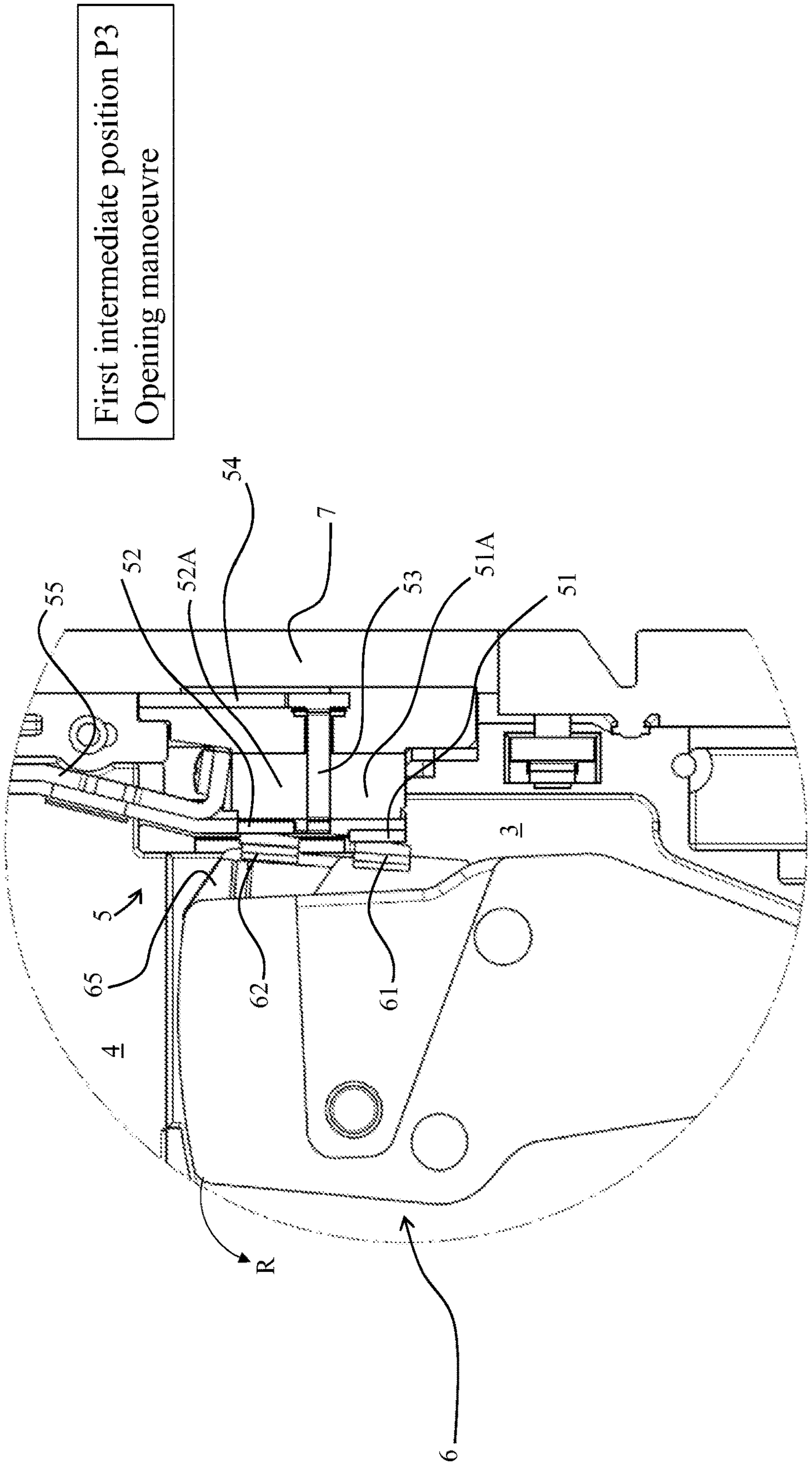

FIG. 11 shows the switch pole with the movable contact assembly 6 in the first intermediate position P3, which is reached upon an initial slight movement of the movable contact assembly according to a rotation direction R about the rotation axis A1 (FIGS. 10-11).

In this situation, the first movable contacts 61 are coupled to the first fixed contacts 51 and the second movable contacts 62 are coupled to the second fixed contacts 52.

Figure 15:
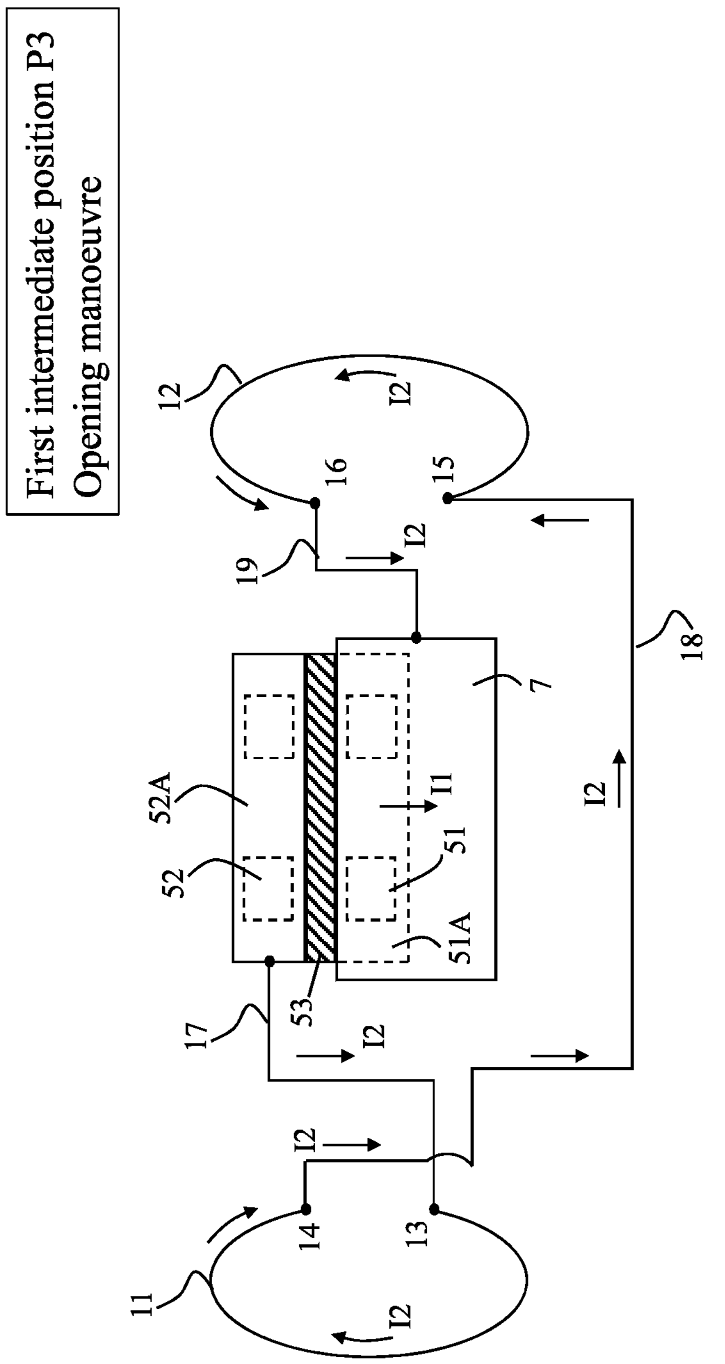

A pole current I can still flow between the pole terminals 7, 8. The pole current I is however split between a first current I1 passing through the first movable contacts 61 and the first fixed contacts 51 and a second current I2 passing through the second movable contacts 62, the second fixed contacts 52 and the first and second coil conductors 11, 12 (FIG. 15). The second current I2 is very lower than the first current I1 as it circulates along a conductive path having a very higher equivalent resistance.

The second current I2 circulating along the coil conductors 11, 12 generates a magnetic field B having a relatively small intensity.

No electric arcs arise between the movable contact assembly 6 and the fixed contact assembly 5 as the pole terminals 7, 8 are still short-circuited.

Figure 12:
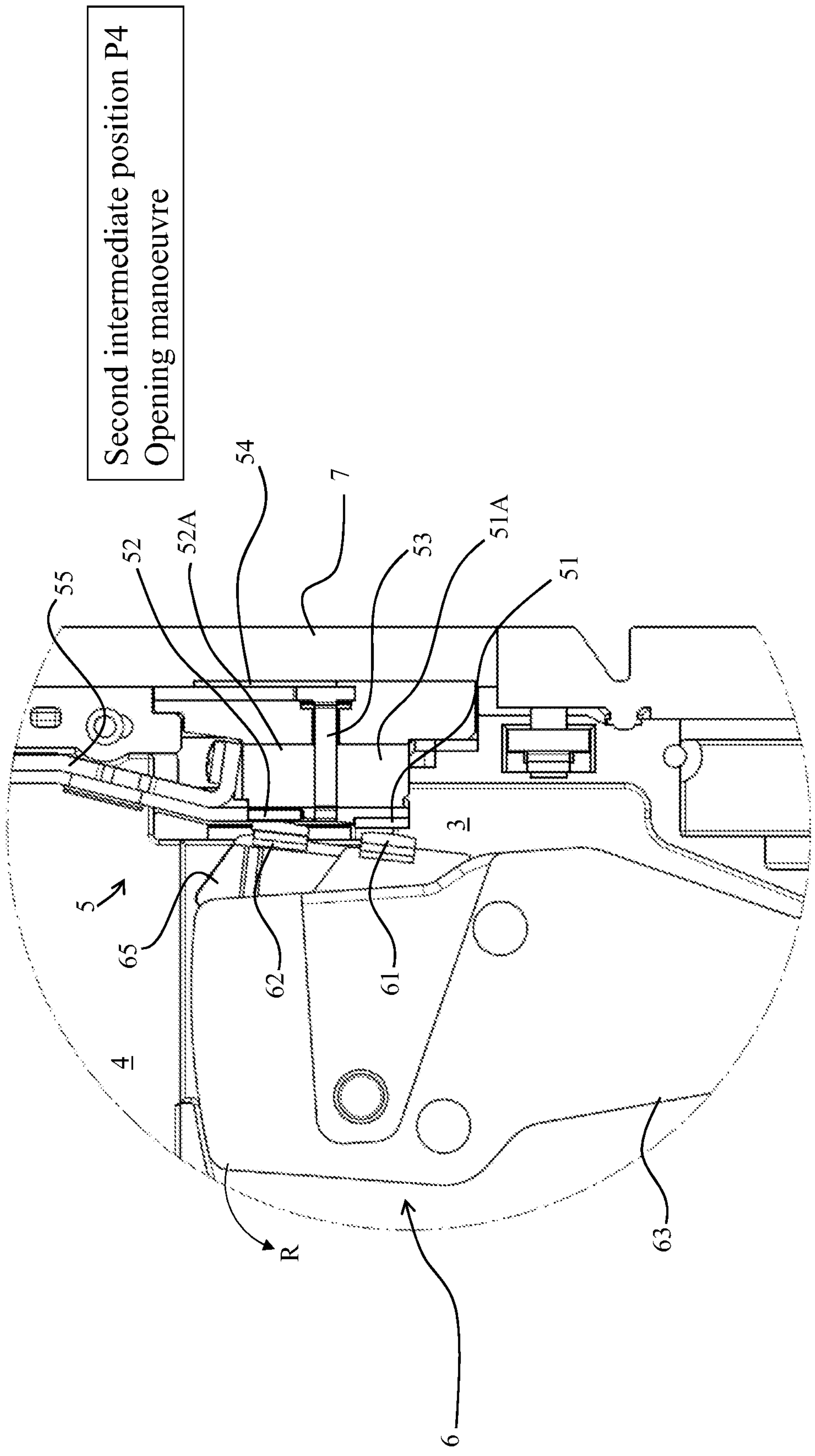

FIG. 12 shows the switch pole with the movable contact assembly 6 in the second intermediate position P3, which is reached upon a further movement of the movable contact assembly according to a rotation direction R (FIGS. 11-12).

In this situation, the first movable contacts 61 are decoupled from the first fixed contacts 51 while the second movable contacts 62 are coupled to the second fixed contacts 52.

Figure 16:
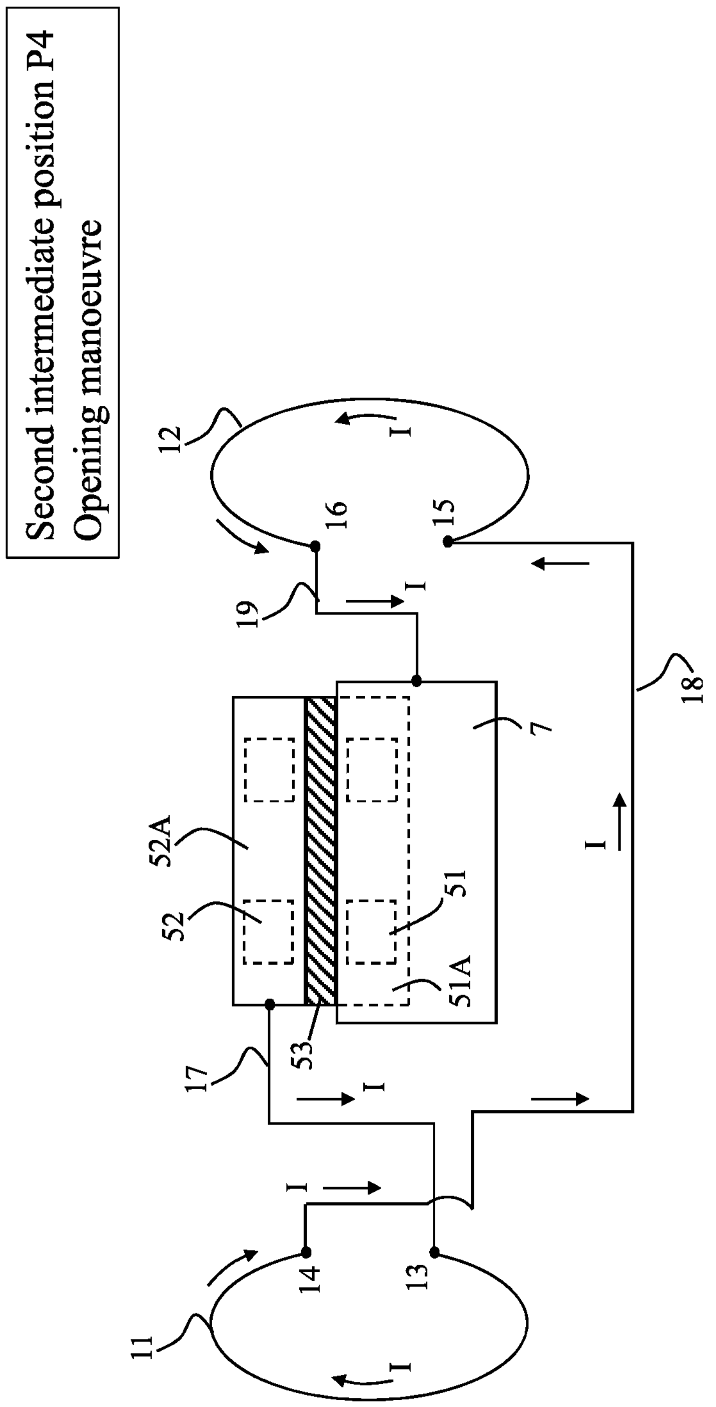
Figure 17:
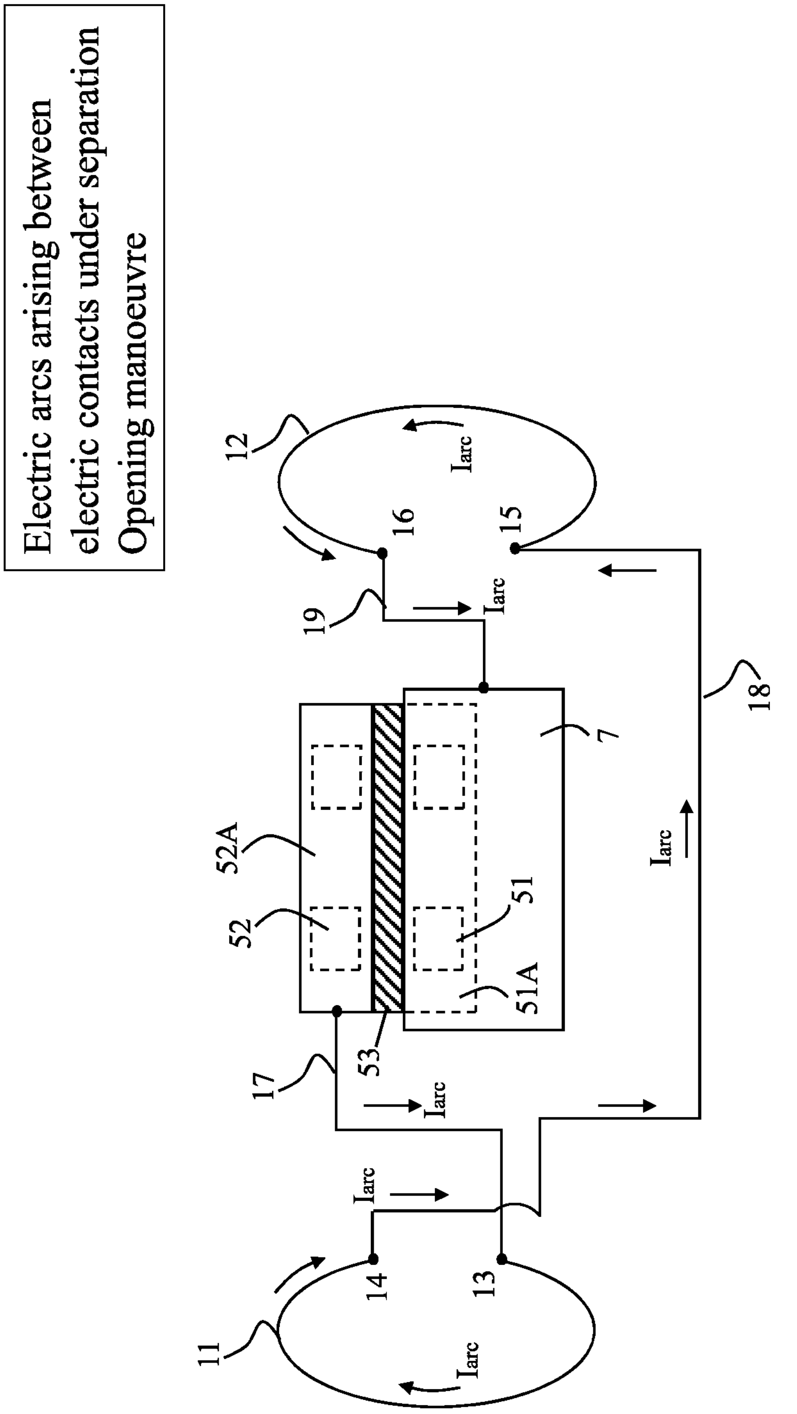

A pole current I can still flow along the switch pole between the pole terminals 7, 8 as these latter are still short-circuited. The pole current I passes entirely through the second movable contacts 62, the second fixed contacts 52 and the coil conductors 11, 12 (FIG. 16). No currents flow along the first movable contacts 61 and the first fixed contacts 51 as these latter are decoupled.

The pole current I circulating along the coil conductors 11, 12 generates a magnetic field B having a relatively high intensity.

No electric arcs arise between the movable contact assembly 6 and the fixed contact assembly 5 as the pole terminals 7, 8 are still short-circuited.

Upon yet a further movement according to the rotation direction R (FIGS. 12-13), also the second movable contacts 62 decouple from the second fixed contacts 52.

As the movable electric contacts 61, 62 are now separated from the corresponding fixed electric contacts 51, 52, a difference of voltage potential is established between the first and second pole terminals 7, 8. At any time, the second pole terminal (and the movable contacts 61, 62) may have a positive voltage polarity while the first pole terminal 7 (and the fixed contacts 51, 52) may have a negative voltage polarity, or vice-versa). Since the dielectric distance between the movable contacts 61, 62 and the fixed contacts 51, 52 is quite short, electric arcs develop between the movable contact assembly 6 and the fixed contact assembly 5 under separation.

The onset of these electric arcs allows arc currents Iarc to circulate along the coil conductors 11, 12 since electric arcs form transient conductive paths between the pole terminals 7, 8.

By flowing through the magnetic field generation arrangement 10, the arc currents Iarc generate a magnetic field B having a relatively high intensity, which displaces the electric arcs towards the arc-extinguishing region 4.

Electric arcs are thus forced to pass through the arc-breaking plates 41 of the arc-chamber 40, which can therefore exert their arc-quenching action.

Finally, when the movable contact assembly 6 reaches the second position P2 (open condition of the switch pole), electric arcs may be finally quenched or continue their quenching process through the full extension of the arc-breaking elements 41.

However, the magnetic field generation arrangement 10 continues to generate a magnetic field B driving the electric arcs towards the arc extinguishing region 4 until said electric arcs are fully quenched.

It is evidenced how the magnetic field generation arrangement 10 exploits the energy provided by the electric arcs between the movable contact assembly 6 and the fixed contact assembly 5 to generate the magnetic field B displacing the electric arcs.

This allows avoiding the installation of permanent magnets to blow the electric arcs towards arc-extinguishing region 4. Differently from the solutions employing permanent magnets, the magnetic field generation arrangement 10 can therefore be used also in AC applications.

The intensity of the magnetic field B generated by the magnetic field generation arrangement 10 increases with the current and thus with the energy of the electric arcs. In other words, the higher is the current of the electric arcs, the stronger is the driving action of the magnetic field B generated by the magnetic field generation arrangement 10. The magnetic field arrangement 10 can thus effectively operate even if the switch pole operates at relatively high voltages (e.g., up to 2.0-2.5 kV either AC or DC) and electric arcs with a huge energy content may therefore arise between the electric contacts under separation during an opening maneuver of the switch pole.

On the other hand, in absence of electric arcs (e.g., at the early stages of the opening maneuver or during a closing maneuver or when the switch pole is in a closed condition, the magnetic field generation arrangement 10 does not influence the operation of the switch pole in any way. At most, the magnetic field generation arrangement forms an alternative path for the pole current flowing along the switch pole.

The technical solutions adopted for the low-voltage switch pole, according to the present disclosure, allow the proposed aims and the aspects to be achieved.

By virtue of the magnetic field generation arrangement included in the switch pole, according to the present disclosure, it is possible to achieve an optimal utilization of the arc-breaking elements of the arc chamber, which are progressively involved in the arcing phenomena during an opening maneuver of the switching device. In particular, substantially all arc breaking plates of the arc chamber can be involved in the quenching action of electric arcs, thereby allowing a uniform and efficient utilization of the arc chamber. Less mechanical and thermal stresses are thus generated into the arc chamber with a consequent prolonged lifetime of this latter.

Additionally, thanks to the magnetic field generation arrangement, the probability that electric arcs strike towards other conductive components of the switch pole, outside the arc-extinguishing region, is remarkably reduced.

The switch pole of the disclosure has a relatively simple and compact structure, relatively easy to manufacture at industrial level, at competitive costs compared to the currently available solutions on the market.

As mentioned above, the present disclosure relates also to a low-voltage switching device including at least a switch pole, according to the disclosure, as previously described.

Such a switching device may be a circuit breaker including three switch poles, according to the disclosure.

What is claimed is:

1. A switch pole for a low-voltage switching device comprising:

an insulating casing defining an internal space with a contact region and an arc extinguishing region of said switch pole;

a first pole terminal and a second pole terminal couplable with corresponding line conductors of an electric line;

a fixed contact assembly arranged in said contact region and including a plurality of fixed electric contacts electrically connected to said first pole terminal, said fixed electric contacts including one or more first fixed contacts and one or more second fixed contacts electrically insulated from said first fixed contacts;

a movable contact assembly arranged in said contact region and including a plurality of movable electric contacts electrically connected to said second pole terminal, said movable electric contacts including one or more first movable contacts and one or more second movable contacts, said movable contact assembly being reversibly movable around a rotation axis, so that said first movable contacts can be coupled to or decoupled from said first fixed contacts and said second movable contacts can be coupled to or decoupled from said second fixed contacts, when said movable contact assembly moves about said rotation axis; and an arc chamber arranged in said arc extinguishing region and comprising a plurality of arc-breaking elements, wherein said switch pole comprises a magnetic field generation arrangement including a first coil conductor and a second coil conductor wound around a winding axis parallel to the rotation axis of said movable contact assembly, said first and second coil conductors being spaced one from another along said winding axis and being electrically connected in series between said second fixed contacts and said first pole terminal, wherein said magnetic field generation arrangement is configured to generate a magnetic field during an opening maneuver of the switch pole, the generated magnetic field being directed in such a way to make electric arcs, which arise between said fixed contact assembly and said movable contact assembly under separation, displace towards the arc extinguishing region of said switch pole, and wherein the switch pole comprises a magnetic shield arrangement arranged at an opposite side of the switch pole relative to said fixed contact assembly, said magnetic shield arrangement configured to confine the magnetic field generated by said magnetic field generation arrangement, during the opening maneuver of said switch pole.

2. The switch pole according to claim 1, wherein said first and second coil conductors are arranged at opposite lateral walls of said insulating casing.

3. The switch pole according to claim 1, wherein:

said first and second coil conductors comprise first and second coil terminals and third and fourth coil terminals respectively, the first coil terminal of said first coil conductor is electrically connected to said second fixed contacts through a first electric bus, the second coil terminal of said first coil conductor is electrically connected to the third coil terminal of said second coil conductor through a second electric bus, and the fourth coil terminal of said second coil conductor is electrically connected to said first pole terminal through a third electric bus.

4. The switch pole according to claim 3, wherein said switch pole comprises an additional casing structure to accommodate said first and second coil conductors and said first, second, and third electric buses, said additional casing structure being fixed to said insulating casing.

5. The switch pole according to claim 3, wherein a central magnetic portion is arranged on a first support fixed to said insulating casing at a front wall of the insulating casing and second magnetic portions are arranged on corresponding second supports fixed to an additional casing structure, at opposite lateral walls of said insulating casing.

6. The switch pole according to claim 1, wherein said magnetic shield arrangement comprises a U-shaped magnetic yoke having a central magnetic portion arranged at a front wall of said insulating casing and a pair of lateral magnetic portions arranged at opposite lateral walls of said insulating casing.

7. The switch pole according to claim 6, wherein said central magnetic portion is arranged on a first support fixed to said insulating casing at said front wall and second magnetic portions are arranged on corresponding second supports fixed to an additional casing structure, at opposite lateral walls of said insulating casing.

8. The switch pole according to claim 1, wherein said movable contact assembly is reversibly movable, about said rotation axis, between a first position, which corresponds to a closed condition of said switch pole, and a second position, which corresponds to an open condition of said switch pole.

9. The switch pole according to claim 8, wherein, when said movable contact assembly is in said first position:

said first movable contacts are coupled to said first fixed contacts; and said second movable contacts are decoupled from said second fixed contacts.

10. The switch pole according to claim 9, wherein, during the opening maneuver of said switch pole, said movable contact assembly moves from said first position to a first intermediate position, and wherein:

said first movable contacts are coupled to said first fixed contacts, and said second movable contacts are coupled to said second fixed contacts.

11. The switch pole according to claim 10, wherein, during the opening maneuver of said switch pole, said movable contact assembly subsequently moves from said first intermediate position to a second intermediate position, and wherein:

said first movable contacts are decoupled from said first fixed contacts, and said second movable contacts are coupled to said second fixed contacts.

12. The switch pole according to claim 11, wherein, during the opening maneuver of said switch pole, said movable contact assembly subsequently moves from said second intermediate position to said second position.

13. The switch pole according to claim 9, wherein when said movable contact assembly is in said second position:

said first movable contacts are decoupled from said first fixed contacts; and said second movable contacts are decoupled from said second fixed contacts.

14. The switch pole according to claim 8, wherein when said movable contact assembly is in said second position:

said first movable contacts are decoupled from said first fixed contacts; and said second movable contacts are decoupled from said second fixed contacts.

15. The switch pole according to claim 14, wherein, during the opening maneuver of said switch pole, said movable contact assembly moves from said first position to a first intermediate position, and wherein:

said first movable contacts are coupled to said first fixed contacts, and said second movable contacts are coupled to said second fixed contacts.

16. The switch pole according to claim 15, wherein, during the opening maneuver of said switch pole, said movable contact assembly subsequently moves from said first intermediate position to a second intermediate position, and wherein:

said first movable contacts are decoupled from said first fixed contacts, and said second movable contacts are coupled to said second fixed contacts.

17. The switch pole according to claim 16, wherein, during the opening maneuver of said switch pole, said movable contact assembly subsequently moves from said second intermediate position to said second position.

18. A low-voltage switching device, comprising:

at least a switch pole, comprising:

an insulating casing defining an internal space with a contact region and an arc extinguishing region of said switch pole;

a first pole terminal and a second pole terminal couplable with corresponding line conductors of an electric line;

a fixed contact assembly arranged in said contact region and including a plurality of fixed electric contacts electrically connected to said first pole terminal, said fixed electric contacts including one or more first fixed contacts and one or more second fixed contacts electrically insulated from said first fixed contacts;

a movable contact assembly arranged in said contact region and including a plurality of movable electric contacts electrically connected to said second pole terminal, said movable electric contacts including one or more first movable contacts and one or more second movable contacts, said movable contact assembly being reversibly movable around a rotation axis, so that said first movable contacts can be coupled to or decoupled from said first fixed contacts and said second movable contacts can be coupled to or decoupled from said second fixed contacts, when said movable contact assembly moves about said rotation axis; and an arc chamber arranged in said arc extinguishing region and comprising a plurality of arc-breaking elements, wherein said switch pole comprises a magnetic field generation arrangement including a first coil conductor and a second coil conductor wound around a winding axis parallel to the rotation axis of said movable contact assembly, said first and second coil conductors being spaced one from another along said winding axis and being electrically connected in series between said second fixed contacts and said first pole terminal, wherein said magnetic field generation arrangement is configured to generate a magnetic field during an opening maneuver of the switch pole, the generated magnetic field being directed in such a way to make electric arcs, which arise between said fixed contact assembly and said movable contact assembly under separation, displace towards the arc extinguishing region of said switch pole, and wherein the switch pole comprises a magnetic shield arrangement arranged at an opposite side of the switch pole relative to said fixed contact assembly, said magnetic shield arrangement configured to confine the magnetic field generated by said magnetic field generation arrangement, during the opening maneuver of said switch pole.

* * * * *